United States Patent
Giorgio Bort et al.

(10) Patent No.: US 10,507,826 B2
(45) Date of Patent: Dec. 17, 2019

(54) SYSTEM AND METHOD FOR DETECTING AN IMPENDING TIP OVER OF A VEHICLE

(71) Applicant: DANA ITALIA S.R.L., Arco (IT)

(72) Inventors: Carlos Maximiliano Giorgio Bort, Levico Terme (IT); Claudio Maffei, Tenno (IT); Alessandro Massei, Riva del Garda (IT); Giulio Ornella, Arco (IT); Lorenzo Serrao, Nago-Torbole (IT)

(73) Assignee: Dana Italia Srl, Arco, Trento (IT)

( * ) Notice: Subject to any disclaimer, the term of this patent is extended or adjusted under 35 U.S.C. 154(b) by 57 days.

(21) Appl. No.: 15/560,511

(22) PCT Filed: Mar. 23, 2016

(86) PCT No.: PCT/EP2016/056374
§ 371 (c)(1),
(2) Date: Sep. 22, 2017

(87) PCT Pub. No.: WO2016/151013
PCT Pub. Date: Sep. 29, 2016

(65) Prior Publication Data
US 2018/0111606 A1    Apr. 26, 2018

(30) Foreign Application Priority Data

Mar. 25, 2015  (EP) .................................. 15425025

(51) Int. Cl.
*B60G 17/016*   (2006.01)
*B60G 23/00*   (2006.01)
(Continued)

(52) U.S. Cl.
CPC ............ *B60W 30/04* (2013.01); *B60W 50/12* (2013.01); *B66F 17/003* (2013.01); *B60W 2050/143* (2013.01)

(58) Field of Classification Search
CPC ........... B60W 2050/143; B60W 30/04; B60W 50/12; B66F 17/003
See application file for complete search history.

(56) References Cited

U.S. PATENT DOCUMENTS

| 4,942,529 A | * | 7/1990 | Avitan | .................... B66F 9/24 340/685 |
| 5,437,354 A | * | 8/1995 | Smith | ................. B60G 17/005 188/266.1 |

(Continued)

FOREIGN PATENT DOCUMENTS

| CN | 102491239 | 6/2012 |
| CN | 102917973 | 2/2013 |

(Continued)

OTHER PUBLICATIONS

European Patent Office, International Search Report with Written Opinion which issued in PCT/EP2016/056374, dated May 17, 2016, 11 pages, European Patent Office, Rijswijk, Netherlands.

(Continued)

*Primary Examiner* — Harry Y Oh
(74) *Attorney, Agent, or Firm* — Marshall & Melhorn, LLC

(57) ABSTRACT

A method and system of detecting an impending tip over of a vehicle with the following steps and apparatus. Acquiring first measurement data, the first measurement data having strain data and at least one of attitude data and acceleration data. Acquiring second measurement data, the second measurement data having strain data and at least one of attitude data and acceleration data. Determining, based on the first measurement data and based on the second measurement data, if the second measurement data is indicative of an impending tip over of the vehicle. Only if it is determined that the second measurement data is indicative of an impending tip over of the vehicle, triggering an alarm signal, overriding a control command or overwriting a control command.

15 Claims, 11 Drawing Sheets

(51) Int. Cl.
  *B62C 3/00* (2006.01)
  *B62K 25/00* (2006.01)
  *G06F 7/00* (2006.01)
  *G06F 17/00* (2019.01)
  *G06F 19/00* (2018.01)
  *B60W 30/04* (2006.01)
  *B66F 17/00* (2006.01)
  *B60W 50/12* (2012.01)
  *B60W 50/14* (2012.01)

(56) References Cited

U.S. PATENT DOCUMENTS 5,825,284 A * 10/1998 Dunwoody ........ B60G 17/0162
                                                    340/440
6,985,795 B2 * 1/2006 Scotese .................. B60G 9/02
                                                    212/278
2006/0267296 A1 * 11/2006 Dodd ..................... B60G 11/27
                                                    280/5.512
2007/0198157 A1 * 8/2007 Righi ....................... B66F 9/24
                                                    701/50

FOREIGN PATENT DOCUMENTS

| | | |
|---|---|---|
| CN | 103211599 | 7/2013 |
| CN | 203639083 | 6/2014 |
| EP | 0343839 A2 | 11/1989 |
| EP | 1758811 B9 | 5/2012 |
| EP | 2511677 A1 | 10/2012 |
| WO | 2011022282 | 2/2011 |

OTHER PUBLICATIONS

European Patent Office, European Search Report which issued in European priority application No. EP15425025.5, dated Aug. 18, 2015, 4 pages, European Patent Office, The Hague, Rijswijk, Netherlands.

* cited by examiner

SYSTEM AND METHOD FOR DETECTING AN IMPENDING TIP OVER OF A VEHICLE

BACKGROUND OF THE INVENTION

The present document primarily relates to a method of detecting an impending tip over of a vehicle, to a sensor system for detecting an impending tip over of a vehicle and to a vehicle including the sensor system. The system and method described in this document may find application in off-highway vehicles such as boom handlers or forklift trucks, for example.

It is known to estimate the position of the center of mass (CoM) of a vehicle such as a telescopic boom handler by monitoring the forces acting on the wheels of the vehicle. To this end, strain gauges may be positioned on one or more vehicle axles to detect the deformation of a vehicle axle. This deformation may be indicative of an impending tip over of the vehicle. If an impending tip over of the vehicle is detected, a warning signal may be triggered or an input command entered by an operator of the vehicle may be overwritten to prevent the vehicle from tipping over.

For example, U.S. Pat. No. 6,985,795B2 relates to a material handler with a telescopic boom that includes a frame, first and second front wheels, first and second rear wheels, and a control system. The front and rear wheels define a generally horizontal plane. The control system determines the center of gravity of the material handler and displays the location of the center of gravity of the material handler within the plane. The system includes a strain gauge mounted to a lower king pin adjacent to a vehicle wheel such that when a force is applied to the adjacent wheel the strain gauge is capable of generating a corresponding signal from stresses transferred to the lower king pin. The control system may prevent the extension of the telescopic boom if the material handler is in danger of tipping over.

However, the accuracy of CoM position estimates through deformation measurements is often impaired by a number of factors. These may include vehicle dynamics and road conditions, for example. As a result, a deformation caused for example by traction forces during normal vehicle operation may be erroneously identified as an impending tip over. Such false positives during tip over detection may compromise usability of the detection system. For example, the operator may be prevented from performing an operation in a situation where the vehicle is in a stable condition and in no danger of tipping over.

BRIEF SUMMARY OF THE INVENTION

It is therefore an object of the present invention to provide a method and a system which are configured to detect an impending tip over of a vehicle with improved accuracy.

This object is solved by the method according to claim 1 and by the sensor system according to the subordinate system claim. Special embodiments are described in the dependent claims.

Thus, a method of detecting an impending tip over of a vehicle is proposed, in particular for identifying false positives during tip over detection. The method comprises at least the following steps:

acquiring first measurement data, the first measurement data comprising strain data, in particular vehicle axle strain data, and at least one of vehicle attitude data and vehicle acceleration data;

acquiring second measurement data, the second measurement data comprising strain data, in particular vehicle axle strain data, and at least one of vehicle attitude data and vehicle acceleration data;

determining, based on the first measurement data and based on the second measurement data, if the second measurement data is indicative of an impending tip over of the vehicle; and only if it is determined that the second measurement data is indicative of an impending tip over of the vehicle, triggering an alarm signal, overriding a control command or overwriting a control command.

The second measurement data is typically acquired after the first measurement data is acquired. Normally, the first measurement data is acquired during a training phase or calibration phase. The first measurement data may be at least temporarily saved, for example in a data storage device such as a data storage chip or the like. The second measurement data is typically acquired during standard operation of the vehicle.

Preferably, the first measurement data and the second measurement data each comprise at least the same two types of data. For example, both the first measurement data and the second measurement data each comprise strain data, in particular vehicle axle strain data, and vehicle attitude data and/or vehicle acceleration data. The vehicle acceleration data may comprise an acceleration of the vehicle in one, two or three independent spatial directions or an absolute value of an acceleration of the vehicle. The vehicle attitude data may include at least one of a pitch angle and a roll angle of the vehicle, for example with respect to the horizon.

The strain data may be indicative of a position of a center of mass of the vehicle relative to the vehicle. The strain data preferably includes at least a mechanical strain of a vehicle axle. Additionally or alternatively the strain data may include a mechanical strain of a vehicle frame, of a vehicle chassis or of other vehicle components whose strain may be indicative of the position of the center of mass of the vehicle relative to the vehicle. The relationship between the strain data and the position of the center of mass of the vehicle may depend on factors such as the geometry of the vehicle, the mass distribution of the vehicle and the stiffness of one or more vehicle components. Typically, a tip over of the vehicle is impending if the position of the center of mass of the vehicle is shifted out of a predetermined stability zone or stability sector defined relative to the vehicle. At least for certain specified situations, for example when the vehicle is at rest and positioned on an even surface, a skilled artisan knows how the position of the center of mass of the vehicle with respect to the vehicle may be determined based on the vehicle strain data and based on one or more of the above mentioned factors such as vehicle geometry, vehicle mass distribution and stiffness of one or more vehicle components. However, as mentioned above, during operation of the vehicle the strain data is usually additionally influenced by other factors such as inertial forces and vehicle attitude. For example, a mechanical strain of one or more vehicle components may be produced when the vehicle is accelerating, decelerating, cornering and/or when the vehicle is positioned on a slope.

The proposed method of detecting an impending tip over of a vehicle is capable of identifying false positives and improving the accuracy during tip over detection by additionally providing at least one of vehicle attitude data and vehicle acceleration data and by determining if the second measurement data is indicative of an impending tip over based on the first measurement data and based on the second measurement data. In this manner, it is possible to distinguish a situation in which a detected mechanical strain of one or more vehicle components, for example of a vehicle axle, is caused by a shift of the center of mass of the vehicle relative to the vehicle from a situation in which the detected mechanical strain is caused or at least partially caused by inertial forces acting on the vehicle or by the fact that the vehicle is positioned on a slope, for example.

Acquiring the first measurement data may comprise acquiring a plurality of first data sets. For each of the first data sets acquiring the first data set may comprise measuring, typically at the same point in time, a mechanical strain and at least one of an attitude and an acceleration of the vehicle. For example, each of the first data sets may include one or more measured strain values, one or more measured vehicle acceleration values and/or one or more measured vehicle attitude values. Those first data sets which are indicative of or associated with an impending tip over of the vehicle may be saved in a database, for example in the data storage device, and marked with a first label, as will be explained in more detail further below. Determining if the second measurement data is indicative of an impending tip over is then based on the second measurement data and at least on the first data sets saved in the database and marked with the first label.

The first data sets may be identified as being indicative of an impending tip over and marked with the first label based on an input command provided by an operator. For example, the first data sets may be acquired during a supervised learning or calibration phase. During the supervised learning or calibration phase the operator may drive the vehicle on a training ground and expose the vehicle to one or more situations in which the vehicle is in danger of tipping over, also termed dangerous situations in the following. For example, the operator may operate the vehicle such that one or more wheels of the vehicle start lifting from the ground. The vehicle being in a dangerous situation may include the center of mass of the vehicle being shifted out of the stability zone or stability sector. At a given point in time during the supervised learning or training phase the operator may manually enter an input command to assign the first label to the first data set recorded at that point in time. In this way, the operator marks the corresponding first data set as being associated with a dangerous situation.

Additionally or alternatively, one or more first data sets of the plurality of first data sets may be identified as being indicative of an impending tip over and marked with the first label automatically, for example if at least one of a measured strain value, a measured vehicle attitude value and a measured vehicle acceleration value of the corresponding first data set falls outside a predetermined range of one or more predefined intervals. It is likewise conceivable that the operator of the vehicle is automatically alerted when it is detected that one or more measured values fall outside of the predetermined range. The operator may then manually confirm that the first data set acquired at that point in time is marked as dangerous. As an alternative to driving the vehicle on a training ground the supervised learning phase may include the vehicle being placed on a test bench or test facility, for example.

Exposing the vehicle to a dangerous situation during the supervised learning phase may include at least one of: letting a vehicle load exceed a specified maximum load; extending a boom or fork beyond a specified maximum extension or lifting it beyond a specified maximum height; accelerating/decelerating the vehicle beyond a specified maximum acceleration/deceleration; letting a vehicle speed exceed a specified maximum speed; increasing a vehicle steering angle beyond a specified maximum steering angle (possibly depending on the vehicle speed and/or vehicle direction).

In principle it is likewise conceivable that the supervised learning or training phase includes acquiring the first measurement data or the first data sets of the first measurement data by modeling or simulating the behavior of the vehicle in a dangerous situation. In that case identifying a first data set as being indicative of an impending tip over and saving that first data set in the database may be based on a mathematical model. However, due to the complexity of the relationship between the vehicle strain data, the vehicle attitude data and the vehicle acceleration data, acquiring the first data sets while driving the vehicle on a training ground or while placing the vehicle on a test bench may typically be preferred over acquiring the first data sets through a mathematical model or simulation.

The first data sets which are not indicative of an impending tip over may likewise be saved in the database. To mark these first data sets as not being indicative of an impending tip over, they may be marked with a second label, the second label being different from the first label. Marking the first data sets with different labels may include any conceivable way of distinguishing those first data sets which have been identified as being indicative of or associated with an impending tip over from those first data sets which have been identified as not being indicative of or associated with an impending tip over. For example, marking the first data sets with different labels may include saving them in different sub-databases. The step of determining if the second measurement data is indicative of an impending tip over may then be based on the second measurement data, on the first data sets, and on the labels (including first and second labels) assigned to the first data sets.

Acquiring the second measurement data may likewise comprise acquiring a second data set. Acquiring the second data set then typically includes acquiring, preferably at the same point in time, vehicle strain data, in particular vehicle axle strain data, vehicle attitude data and/or vehicle acceleration data. Like the first data sets described above, the second data set then typically includes one or more measured vehicle strain values, one or more measured vehicle acceleration values and/or one or more measured vehicle attitude values.

Determining if the second measurement data is indicative of an impending tip over may comprise:
  determining, based on the first data sets marked with the first label and/or based on the first data sets marked with the second label, at least one continuous subset of a measurement data space, the measurement data space comprising the first data sets and the second data set, wherein the continuous subset is determined such that the continuous subset does not comprise the data sets labeled with the first label; and
  identifying the second data set as being indicative of an impending tip over if the second data set falls outside the continuous subset, and identifying the second subset as not being indicative of an impending tip over if the second subset falls within the continuous subset.

The dimension of the measurement data space is determined by the number of measured values included in each of the first data sets and in the second data set. The continuous subset representing the data sets which are not associated with an impending tip over can be characterized by the boundary which separates the continuous subset from its complement. For example, if the measurement data space is n-dimensional the continuous subset or one of the continuous subsets can be characterized by an (n−1)-dimensional manifold or polygon embedded in the n-dimensional data space, the (n−1)-dimensional manifold or polygon forming the boundary between the continuous subset and its complement ("n" being a positive integer). The n-dimensional continuous subset and/or the (n−1)-dimensional boundary that separates the continuous subset from its complement may be determined using any suitable classifier such as a Support Vector Machine (SVN). For instance, the boundary separating the continuous subset from its complement may be chosen such that it has the same n-dimensional distance from position of the center of mass of the first data sets labeled with the first label and from the position of the center of mass of the first data sets labeled with the second label.

In a particularly simple example the measurement data space is a two-dimensional plane and the continuous subset is a half-plane situated on one side of a (one-dimensional) straight line embedded in the two-dimensional plane, the straight line forming the boundary between the continuous subset and its complement.

After the supervised learning phase is completed, the database and/or the continuous subset representative of the "safe" sector of the measurement data space may be continuously adjusted or updated based on the first data sets saved in the database, based on the second data sets acquired during normal operation of the vehicle and based on the labels assigned to these data sets. In the following, this phase is termed the reinforcement learning phase.

When the second data set is identified as being indicative of an impending tip over, the method may further include the step of determining if the second data set falls within a predefined neighbourhood of any one of the data sets which are saved in the database and labeled with the first label. If the second data set does not fall within the neighbourhood of any of the data sets labeled with the first label, the database may be updated by labeling the second data set with the first label and by saving the second data set in the database.

In this manner, the database including previously measured data sets may be continuously updated normal operation of the vehicle. The neighbourhood of an (n-dimensional) data set X of the database may be defined as the set of points of the measurement data space whose distance from the data set X is smaller than a predefined threshold distance, for example. The distance between two points of the (n-dimensional) measurement data space may be defined by the Mahalanobis distance or by any other suitable metric, for example by the Euclidean metric.

The database may likewise be updated if the newly measured second data set is identified as not being indicative of an impending tip over. In that case, the second data set may be saved in the database and labeled with the second label.

The vehicle may be used under a variety of different conditions. For example, the vehicle may be used on different grounds, the vehicle may be loaded with loads of different weights or the load of the vehicle may be placed at different positions with respect to the vehicle, thereby shifting its center of mass. As a result, a measured data set that is indicative of an impending tip over of the vehicle in one context may not be indicative of an impending tip over in another context. Therefore, the method may provide steps that allow the re-shaping of the continuous subset representing the safe sector of the measurement data space. For example, it may be assumed that an operator does not repeatedly operate the vehicle in a given sector of the measurement data space if the vehicle were in danger of tipping over when operated in this sector of the measurement data space.

Thus, in the event that the second data set is identified as being indicative of an impending tip over and that the second data set falls within the neighbourhood of a given data set X labeled with the first label (indicating that a similar data set has previously been recorded and identified as dangerous), a frequency $\omega$ of the event that a measured data set falls within the neighbourhood of this data set X may be determined. For example, the frequency $\omega$ may be computed according to the formula $\omega = k \cdot N/T$, where "N" is the occurrence of the event that a data set, preferably measured after the completion of the supervised learning phase, falls within the neighbourhood of the data set X, "T" is the time elapsed since the last such event and "k" is a predetermined constant.

If the frequency $\omega$ is above a predetermined threshold frequency, the database may be updated by re-labeling the data set X with the second label. Additionally, other data sets within the neighbourhood of the data set X may be re-labeled with the second label to indicate that the data set X and its neighbourhood are now regarded as not being indicative of an impending tip over.

When the database is updated by adding a newly measured data set to the database and/or by re-labeling one or more data sets already saved in the database, the geometry of the continuous subset representative of the safe sector of the measurement data space may likewise be updated. For example, the continuous subset may be updated based on the updated database. The continuous subset may be updated such that the updated continuous subset does not comprise the data sets of the updated database which are labeled with the first label. Updating the continuous subset of the measurement data space may include re-shaping the n-dimensional geometry of the continuous subset, in particular re-shaping the boundary of the continuous subset. In this manner the database and the continuous subset may be continuously kept up-to-date with varying operating conditions.

Furthermore, a sensor system for detecting an impending tip over of a vehicle, and in particular for identifying false positives during tip over detection is proposed. The sensor system comprises:
at least one strain sensor for acquiring strain data, in particular vehicle axle strain data;
at least one further sensor, the further sensor comprising at least one of a gyrometer for acquiring attitude data and an accelerometer for acquiring acceleration data; and
a control unit;
wherein the sensors are configured to acquire first measurement data and second measurement data, the first measurement data and the second measurement data each including strain data, in particular vehicle axle strain data, and at least one of attitude data and acceleration data; and
wherein the control unit is configured to control the strain sensor and the at least one further sensor and to perform the method steps of the above described method.

The strain sensor may include one or more strain gauges. A strain gauge typically includes a flexible insulating support, for example in the form of an insulating foil, and a metallic foil pattern disposed on the support. Strain gauges take advantage of the fact that the electrical conductance or the electrical resistance of an electrical conductor may change as the conductor is deformed. Measuring the electrical resistance of the conductor of the strain gauge may therefore serve as a measure of the deformation of the conductor or as a measure of the deformation of the component to which the strain gauge is attached. Strain gauges of this type are generally known in the art. The gyrometer and/or the accelerometer may be configured as microelectromechanical systems (MEMS), for example.

The sensor system may further comprise at least one of:
one or more steering sensors for measuring a vehicle steering angle;
one or more speed sensors for measuring a vehicle speed;
one or more tire pressure sensors for measuring a pneumatic pressure of one or more pneumatic tires of the vehicle; and
an input device for controlling a working implement of the vehicle.

The control unit is then typically additionally configured to control at least one of the steering sensors, the speed sensors, the tire pressure sensors and the input device for controlling the working implement and to receive measurement data and/or working implement control data from these sensors and/or from the input device.

The working implement may include one or more hydraulic actuators such as hydraulic cylinders or hydraulic motors and/or one or more control valves. For example, the working implement may comprise a lifting mechanism such as a moveable or extendable boom, a moveable bucket or a tilting mechanism. The input device for controlling or steering the working implement may include at least one of a joystick, a touchscreen, a switch, a lever, a pedal, or the like.

Each of the first and the second measurement data may include at least one of vehicle steering data, vehicle speed data, tire pressure data and working implement control data. For example, each of the first data sets and/or the second data set may include a vehicle steering angle value, a vehicle speed value, one or more values indicative of a pneumatic pressure of a vehicle tire, a position or a state of the working implement and/or a control position of the input device for controlling the working implement. Using this additional data may further improve the capability of the proposed system and method to identify false positives during tip over detection.

The strain sensor may include at least two strain gauges disposed on a common mechanical support, wherein the strain gauges are spaced apart from each other so that the strain gauges are configured to simultaneously measure a mechanical strain at different positions, in particular at different positions on a vehicle axle. The strain gauges of the strain sensor may be arranged in parallel to a longitudinal direction of the vehicle axle, for example. The differential reading of the two strain gauges arranged on the vehicle axle in this manner may serve to distinguish a vertical force exerted on the axle from a lateral force exerted on the axle.

The strain sensor may also comprise a plurality of strain gauges arranged in a rosette-type arrangement. Such an arrangement allows determining the principal strain components of the planar strain tensor. From experiments it has been shown that non-vertical loads caused by vehicle dynamics and road characteristics may affect the orientation and the absolute value of the principal strain components of the planar strain tensor of a vehicle axle.

The strain sensor, the control unit and the at least one further sensor may be disposed on the common mechanical support, thereby forming a compact sensor platform. In particular, the sensor system may comprise two or more sensor platforms of the aforementioned type, wherein the sensor platforms are connected to exchange data with each other, thereby forming a distributed sensor network. The different sensor platforms of the sensor network may be placed on different axles or on different semi-axles of the vehicle, for example. Acquiring measurement data at different positions on a vehicle axle, on different axles or generally at different positions of the vehicle may further improve the ability to characterize the dynamical state of the vehicle and to distinguish measurement data which is indicative of an impending tip over of the vehicle from measurement data which is not indicative of an impending tip over.

The sensor system may further comprise a central vehicle control unit and a CAN bus. One of the sensor platform control units may be configured to function as a master control unit of the sensor network, wherein the master control unit is configured to communicate with the central vehicle control unit via the CAN bus. The other platform control units may then send the measurement data acquired by means of their sensors to the master control unit. The master control unit may then fuse and process the measurement data acquired through the different sensor platforms and through at least one of the above mentioned steering sensor, tire pressure sensor and vehicle speed sensor and/or the working implement control data entered through the input device for controlling or steering the working implement. In particular, the master control unit may be configured to carry out the steps of the above described method of detecting an impending tip over.

In order to increase the robustness of the sensor network, each of the sensor platform control units may be configured to function as the master control unit of the sensor network. For example, each of the sensor platform control units may be connected to the CAN bus. Also, at least one of the steering sensor, the tire pressure sensor, the vehicle speed sensor and the input device for controlling the working implement may be connected to the CAN bus. The central vehicle control unit may be configured to test a health status of each of the sensor platform control units and to select, based on the health status of the sensor platform control units, one of the sensor platform control units as the master control unit of the sensor network. This allows replacing the master control unit in case the master control unit is malfunctioning, for example. In order to test the health status of the platform control units, the central vehicle control unit and/or the platform control units may be configured to send health status monitoring messages to the other platform control units via the common CAN bus. The health status of a given platform control unit may then comprise a score that is based on the number of responses of that platform control unit to the health status monitoring messages received by that platform control unit.

Furthermore, a vehicle including a vehicle axle or semi-axle and including the above described sensor system is proposed, wherein the strain sensor is disposed on the vehicle axle or semi-axle for measuring vehicle axle strain data. The vehicle may be an off-highway vehicle, in particular a telescopic boom handler, a forklift truck or the like.

BRIEF DESCRIPTION OF THE DRAWINGS

Preferred embodiments of the presently proposed system and method are described in the following detailed description and are depicted in the accompanying drawing in which:

FIG. 3a shows a uniform deformation of a pair of strain gauges disposed on a vehicle axle, wherein the uniform deformation of the strain gauges is indicative of a vertical load acting on the vehicle axle;

FIG. 3b shows a non-uniform deformation of a pair of strain gauges disposed on a vehicle axle, wherein the non-uniform deformation of the strain gauges is indicative of a force acting in a direction of motion of the vehicle;

FIG. 3c shows the measured deformation of the strain gauges shown in FIG. 3a;

FIG. 3d shows the measured deformation of the strain gauges shown in FIG. 3b;

DETAILED DESCRIPTION OF THE INVENTION

Figure 1:
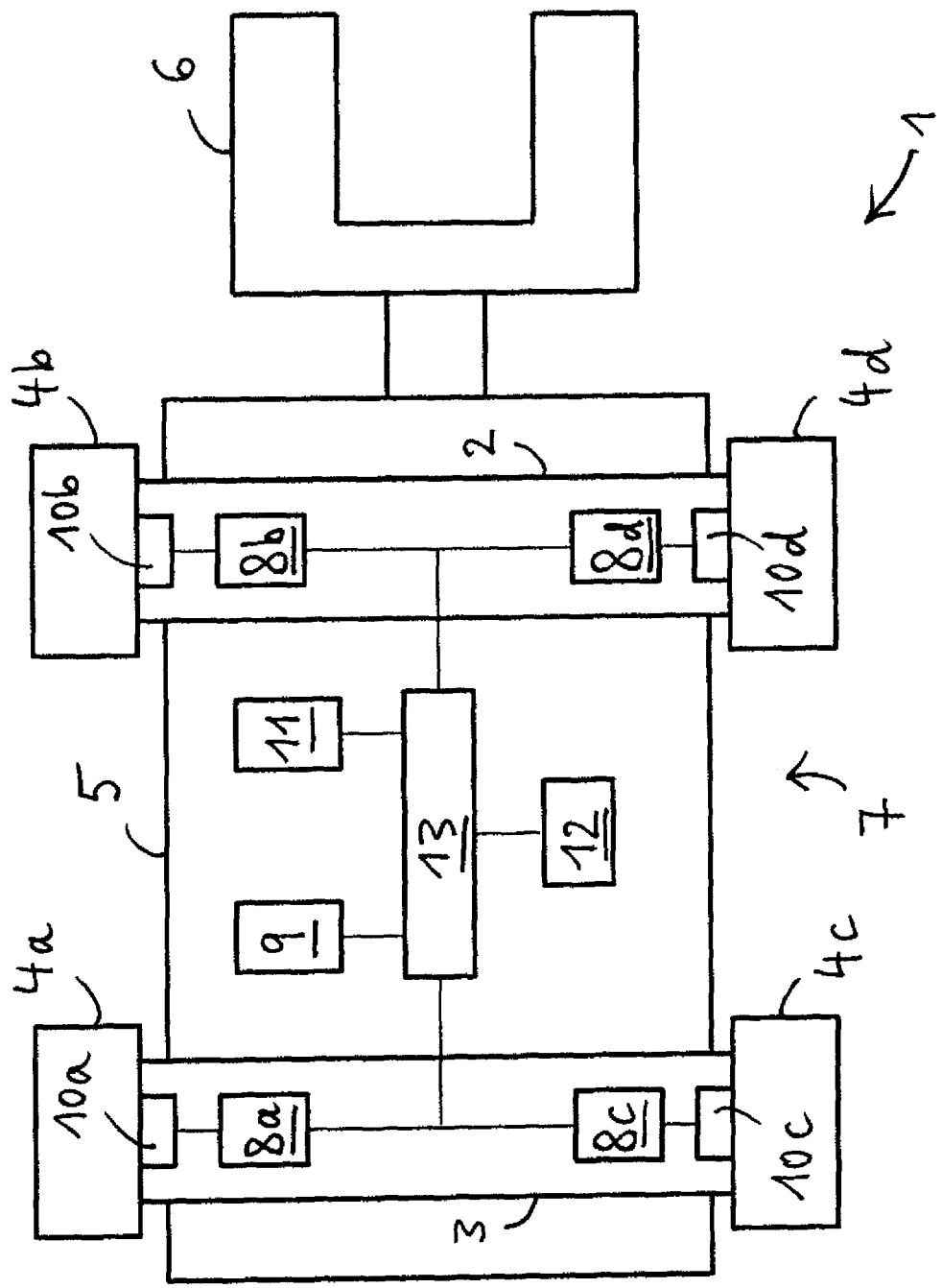
FIG. 1 a vehicle including an extendable boom and a sensor system, the sensor system comprising sensor platforms arranged on different semi axes of a vehicle, vehicle speed sensors, a steering sensor, a tire pressure sensor and a central vehicle control unit including an input device for controlling a working implement of the vehicle.

FIG. 1 schematically illustrates a vehicle 1 including a front axle 2, a rear axle 3, wheels 4a-d including pneumatic tires, a vehicle frame 5 and an extendable boom 6. The vehicle 1 further comprises a sensor system 7 for detecting an impending tip over of the vehicle 1.

The sensor system 7 includes sensor platforms 8a-d disposed mid-length on different semi axles of the front axle 2 and of the rear axle 3, a steering sensor 9 for detecting a steering angle of the vehicle 1, speed sensors 10a-d for measuring a speed of the wheels 4a-d and a tire pressure sensor 11 for detecting a pneumatic pressure of the tires. In alternative embodiments the sensor system 7 may include a smaller number of sensor platforms. However, the sensor system 7 generally includes at least one sensor platform of the type described herein. Also, in alternative embodiments the sensor system 7 may include none of the sensors 9, 10a-d, 11 or only some of them.

The sensor system 7 further includes a central vehicle control unit 12 and a CAN bus 13. The sensor platforms 8a-d, the sensors 9, 10, 11 and the central vehicle control unit 12 are mutually connected through the CAN bus 13, thereby forming a distributed sensor network. Specifically, the sensor platforms 8a-d, the sensors 9, 10, 11 and the central vehicle control unit 12 may exchange measurement data and/or processed measurement data through the CAN bus 13. The sensor system 7 further includes an alarm device (not shown) which is configured to trigger an alarm when the sensor system 7 detects that the vehicle 1 is in danger of tipping over. The alarm device may be configured to trigger an optical alarm signal or an acoustic alarm signal, for example.

The central vehicle control unit 12 may include one or more input devices through which an operator of the vehicle 1 may control the dynamics of the vehicle 1, the working hydraulics of the vehicle 1 including the boom 6, and the sensor system 7. The central vehicle control unit 12 may further include an electronic control unit such as a microprocessor or an FPGA configured to send electronic control signals to the sensor platforms 8a-d, to the sensors 9, 10, 11 of the sensor system 7 and to one or more actuators for controlling the movement of the boom 6.

The input devices of the central vehicle control unit 12 configured to control the dynamics of the vehicle 1 may include at least one of a steering wheel, an accelerator pedal, a brake and a speed direction changing device. The input devices for controlling the working hydraulics of the vehicle 1 including the boom 6 may comprise at least one of a joystick, a touchscreen, knobs, switches, levers, pedals or the like. The input devices for entering control commands aimed at controlling the sensor system 7 may likewise include at least one of a joystick, a touchscreen, knobs, switches, levers, pedals or the like.

Figure 2:
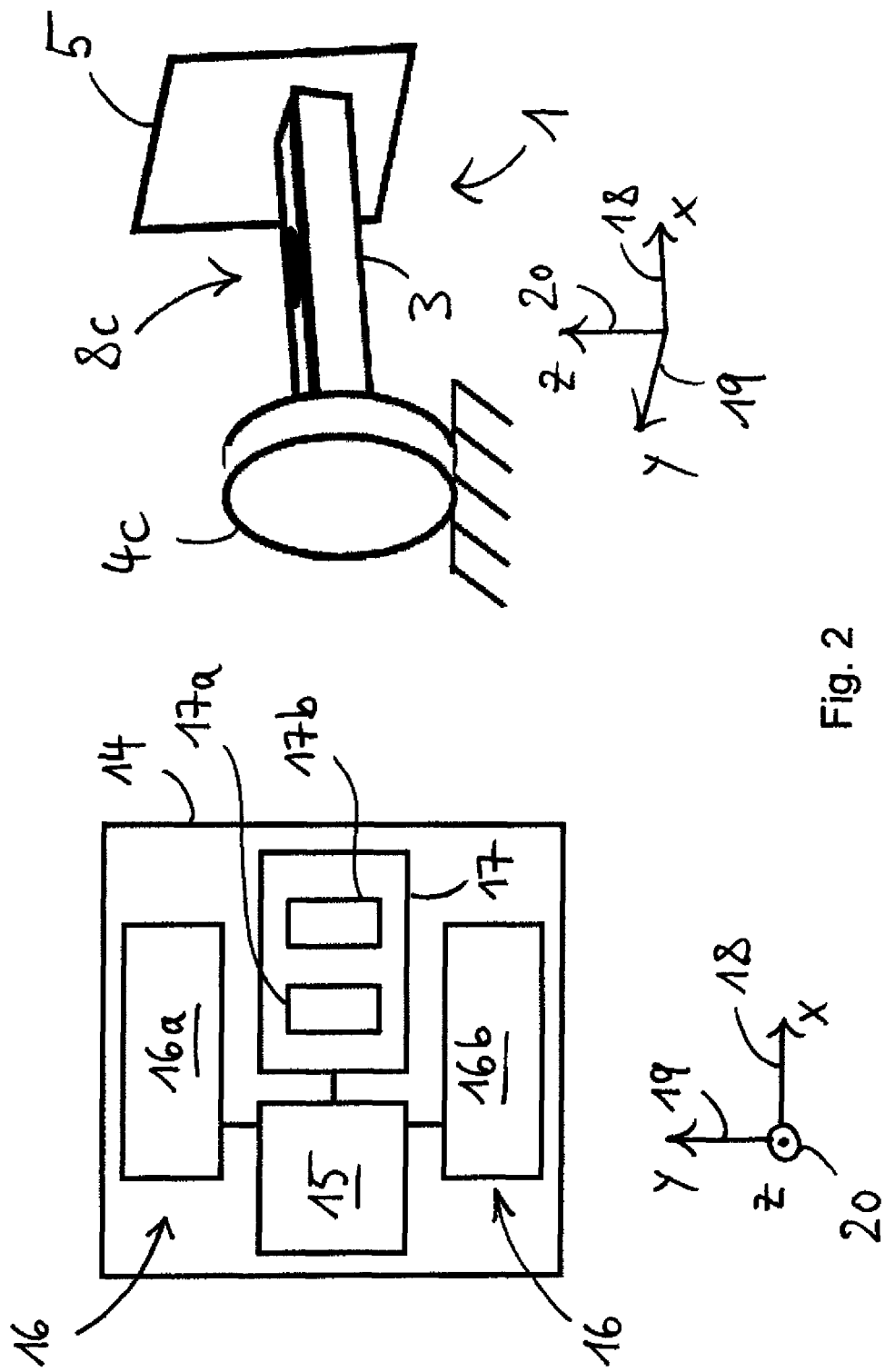
FIG. 2a shows a detailed view of one of the sensor platforms of FIG. 1, the sensor platform including an electronic control unit, a strain sensor and an inertia measurement unit (IMU), the IMU comprising an accelerometer and a gyroscope.
FIG. 2b shows a perspective view of the sensor platform of FIG. 2a arranged on a vehicle axle.

FIG. 2a schematically shows a detailed view of the sensor platform 8c of FIG. 1. FIG. 2c shows a perspective view of the sensor platform 8c being arranged on the rear axle 3. Here and in the following recurring features are designated by the same reference signs. The remaining sensor platforms 8a-b and 8d shown in FIG. 1 are identical to the sensor platform 8c shown in FIG. 2a.

The sensor platform 8c comprises a mechanical support 14, an electronic control unit 15, a strain sensor 16 and an inertia measurement unit (IMU) 17. The control unit 15, the strain sensor 16 and the IMU 17 are disposed on and attached to the common mechanical support 14. The strain sensor 16 is configured to measure a mechanical strain of the rear axle 3. Specifically, the strain sensor 16 includes two elongate strain gauges 16a, 16b arranged in a plane and spaced apart from one another. The IMU 17 includes a microelectromechanical accelerometer 17a and a microelectromechanical gyrosensor or gyrometer 17*b*. The accelerometer 17*a* is configured to measure an acceleration of the platform 8*c* along an x-axis 18, along a y-axis 19 and along a z-axis 20, wherein the axes 18, 19, 20 span a right-handed Cartesian coordinate system. The gyrometer 17*b* is configured to measure a pitch angle and a roll angle of the platform 8*c* with respect to the horizon, wherein the pitch angle designates an angle of rotation with respect to the x-axis 18 and the roll angle designates an angle of rotation with respect to the y-axis 19.

During operation of the sensor system 7 one of the control units of the sensor platforms 8*a-d*, for example the control unit 15 of the sensor platform 8*c*, may function as a master control unit of the sensor network, wherein the master control unit is configured to communicate with the central vehicle control unit 12 via the CAN bus 13. The control units of the remaining sensor platforms 8*ab* and 8*d* may then send the measurement data acquired by means of their sensors to the master control unit 15 of the sensor platform 8*c*. The master control unit may then fuse and process the measurement data acquired by means of the sensor platforms 8*a-d* and by means of at least one of the steering sensor 9, the speed sensors 10*a-d* and tire pressure sensor 11. In particular, the master control unit may be configured to process the acquired measurement data and detect an impending tip over of the vehicle 1, as described further below.

In order to increase the robustness of the sensor network, each of the control units of the sensor platforms 8*a-d* may be configured to function as the master control unit of the sensor network. The central vehicle control unit 12 may be configured to test a health status of each of the control units of the sensor platforms 8*a-d* and to select, based on the health status of the sensor platform control units, one of the sensor platform control units as the master control unit of the sensor network. This allows replacing the current master control unit in case this master control unit is malfunctioning, for example. In order to test the health status of the platform control units, the central vehicle control unit 12 and/or the platform control units may be configured to send health status monitoring messages to the other platform control units via the common CAN bus 13. The health status of a given platform control unit may comprise a score that is based on the number of responses of that platform control unit to the health status monitoring messages received by that platform control unit.

Figure 3:
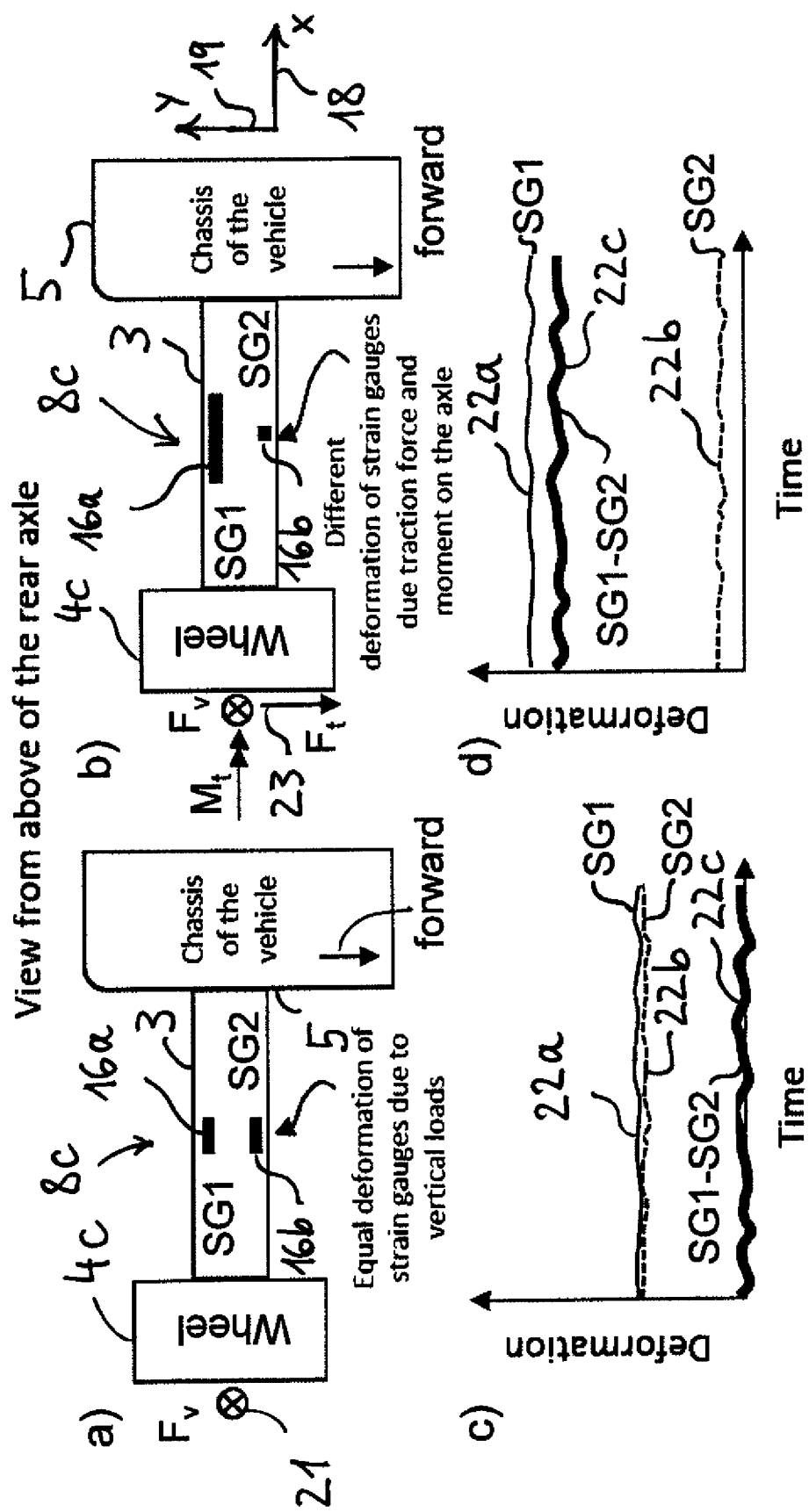

FIGS. 3*a* and 3*b* show the alignment of the stain gauges 16*a*, 16*b* of the sensor platform 8*c* with respect to the rear axle 3. For simplicity, the remaining components of the sensor platform 8*c* are not shown in FIGS. 3*a* and 3*b*. The strain gauges of the remaining sensor platforms 8*a-b*, 8*d* may be aligned on the axles 2, 3 in the same manner. The sensor platform 8*c* is disposed on the rear axle 3 in such a way that the elongate strain gauges 16*a*, 16*b* are aligned with the longitudinal extension of the rear axle 3. As the strain gauges 16*a*, 16*b* are disposed on the rear axle 3 at different positions in the x-y-plane, deformations of the rear axle 3 within the x-y-plane may be distinguished from deformations of the rear axle 3 along the vertical z-direction 20. The remaining sensor platforms 8*a-b*, 8*d* may be arranged on the axles 2, 3 in the same manner.

In FIG. 3*a* a vertical force 20 acts on the rear axle 3 along the z-direction 20. The vertical force 20 or a change in the vertical force 20 may be indicative of a load being placed on the vehicle 1 or on the extendable boom 6 of the vehicle 1, for example. The vertical force 20 or an increase or decrease thereof may therefore be an indicator or one of several indicators for the fact that the vehicle 1 is in danger of tipping over. The vertical force 20 acting on the rear axle 3 results in a uniform deformation of the rear axle 3 and of the strain gauges 16*a*, 16*b*. A time course of the deformation 22*a* of the strain gauge 16*a* and of the deformation 22*b* of the strain gauge 16*b* are depicted in FIG. 3*c*. The control unit 15 is configured to compute a differential strain or differential deformation 22*c* of the rear axle 3 defined as the difference between the deformations 22*a*, 22*b*. Due to the uniform deformation of the strain gauges 16*a*, 16*b* in FIG. 3*a* the differential deformation 22*c* of the rear axle 3 is near zero or below a predefined threshold. In particular, the differential strain 22*c* is smaller than the deformation 22*a* and smaller than the deformation 22*b*.

In FIG. 3*b* traction force 23 acts on the rear axle 3 along the along the negative y-direction 19. The traction force 23 may be due to an acceleration or deceleration of the vehicle 1 along its direction of motion, for example. Among other things, the traction force 23 may be influenced by a pneumatic pressure in the tire 4*c* or by the composition of ground on which the vehicle 1 is driving. As the traction force 23 has a component which acts perpendicular to the extension of the elongate strain gauges 16*a*, 16*b*, the strain gauges 16*a*, 16*b* undergo different deformations. Here, the strain gauge 16*a* is elongated while the strain gauge 16*b* is compressed. Consequently, the differential strain 22*c* is above a predefined threshold value. In particular, the differential strain 22*c* is smaller than the deformation 22*a* of the strain gauge 16*a* and larger than the deformation 22*b* of strain gauge 16*b*, as shown in FIG. 4*d*.

In addition to the parallel strain gauges 16*a*, 16*b* or as an alternative to the parallel strain gauges 16*a*, 16*b* the sensor platform 8*c* may include three or more strain gauges arranged in a planar star-like or rosette-like formation. Rosette-like strain gauge arrangements of this sort, which are generally known in the art, allow the computation of the principal components of the planar strain tensor. Non-vertical loads caused by vehicle dynamics such as traction and cornering and/or caused by road characteristics are known to affect the orientation and the module of the principal components of the planar strain tensor. Therefore, additional information regarding vehicle dynamics and road characteristics may be extracted from a mechanical strain measured by a rosette-type strain sensor.

The sensor system 7 is configured to perform a method capable of detecting an impending tip over of the vehicle 1 with improved specificity as compared to tip over detection systems and methods known from the prior art. The method includes the application of a machine learning algorithm. During a first learning phase, also termed supervised learning phase, an operator may drive the vehicle 1 on a training ground and expose the vehicle 1 to a plurality of safe situations in which the vehicle 1 is stable and to a plurality of dangerous situations in which the vehicle 1 is in danger of tipping over. Preferably, during the supervised learning phase the operator exposes the vehicle 1 to a number of situations in which the vehicle 1 is stable and not in danger of tipping over and in which the axles 2, 3 of the vehicle 1 are deformed by "normal" maneuvers such as driving the vehicle 1 around a bend or driving the vehicle 1 on a slope. In many such cases, tip over detection systems known from the prior art would trigger a false alarm by alerting the operator of the vehicle 1 to an impending tip over, because these known systems are not capable of distinguishing a deformation of the axles 2, 3 caused by a shift of the center of mass of the vehicle 1 from a deformation of the axles 2, 3 caused by traction forces, steering forces or the like. The operator of the vehicle 1 may mark the beginning and the end of the supervised learning phase by entering corresponding input commands through the central vehicle control unit 12, for example.

As the vehicle 1 is driven on the training ground during the supervised learning phase, the master control unit of the sensor system 7, for example the control unit 15 of the sensor platform 8c, controls the strain sensors and the IMUs of the sensor platforms 8a-d and optionally at least one of the steering sensor 9, the speed sensors 10a-d and the tire pressure sensor 11 to acquire first measurement data. The master control unit 15 then processes the first measurement data and stores the first measurement data and/or the processed first measurement data in the data storage device of the control unit 15.

The first measurement data comprises a plurality of data sets $p_1, \ldots, p_k$ ("k" being a positive integer index), each of comprises a plurality of measured values. The measured values comprised in a given data set of the data sets $p_1, \ldots, p_k$ are measured or acquired at the same time. For example, the measured values included in the data set $p_1$ are measured at a point in time $t_1$, the measured values included in the data set $p_2$ are measured at a point in time $t_2$, the measured values included in the data set $p_3$ are measured at a point in time $t_3$, etc. where $t_1 < t_2 < t_3$ and so on.

The measured values comprised in the data sets $p_1, \ldots, p_k$ include: deformation values measured by the strain sensors of the sensor platforms 8a-d, acceleration values measured by the accelerometers of the sensor platforms 8a-d, attitude values measured by the gyrometers of the sensor platforms 8a-d, a steering angle of the vehicle 1 measured by the steering sensor 9, speed values measured by the speed sensors 10a-d and tire pressure values measured by the tire pressure sensor 11. In alternative embodiments the data sets $p_1, \ldots, p_k$ may include fewer measurement values or additional measurement values. However, the data sets $p_1, \ldots, p_k$ typically include at least one or more strain values or deformation values and at least one of an acceleration value and/or an attitude value. It is likewise conceivable that the data sets $p_1, \ldots, p_k$ include data which is derived from the above described measured values. For instance, the data sets $p_1, \ldots, p_k$ may comprise the differential strain 11c mentioned above. Additionally or alternatively the data sets $p_1, \ldots, p_k$ may comprise a rate of change of the measured values derived from data sets which are acquired shortly after one another. For example, the data sets $p_1, \ldots, p_k$ may comprise a first, second or higher derivative of the deformation of the axles 2, 3 or of the pitch angle and/or the of roll angle of the vehicle 1.

Figure 4:
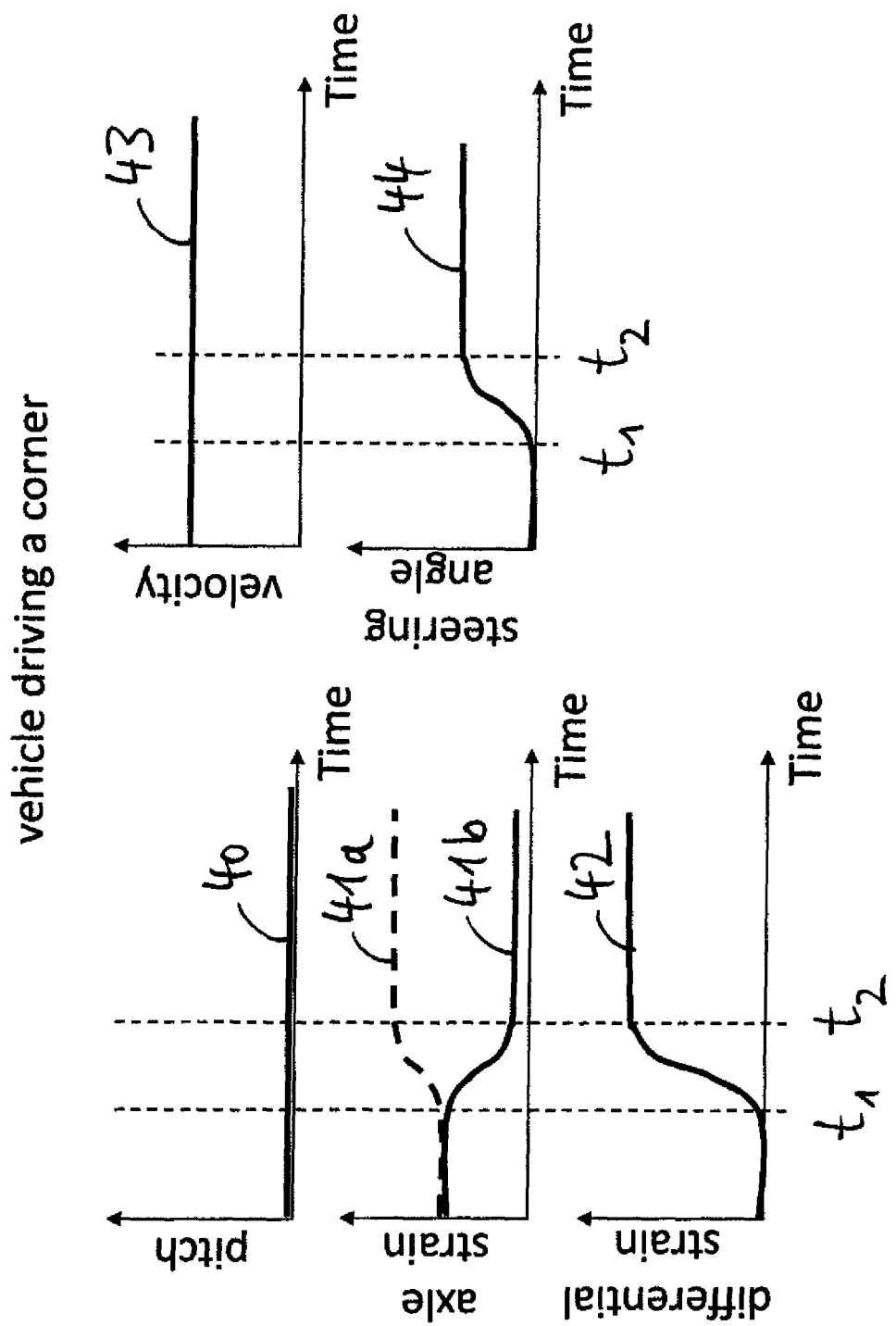
FIG. 4 shows vehicle attitude data, axle strain data, vehicle velocity data and vehicle steering data acquired during a supervised learning phase, wherein the data is acquired while the vehicle is cornering.
Figure 5:
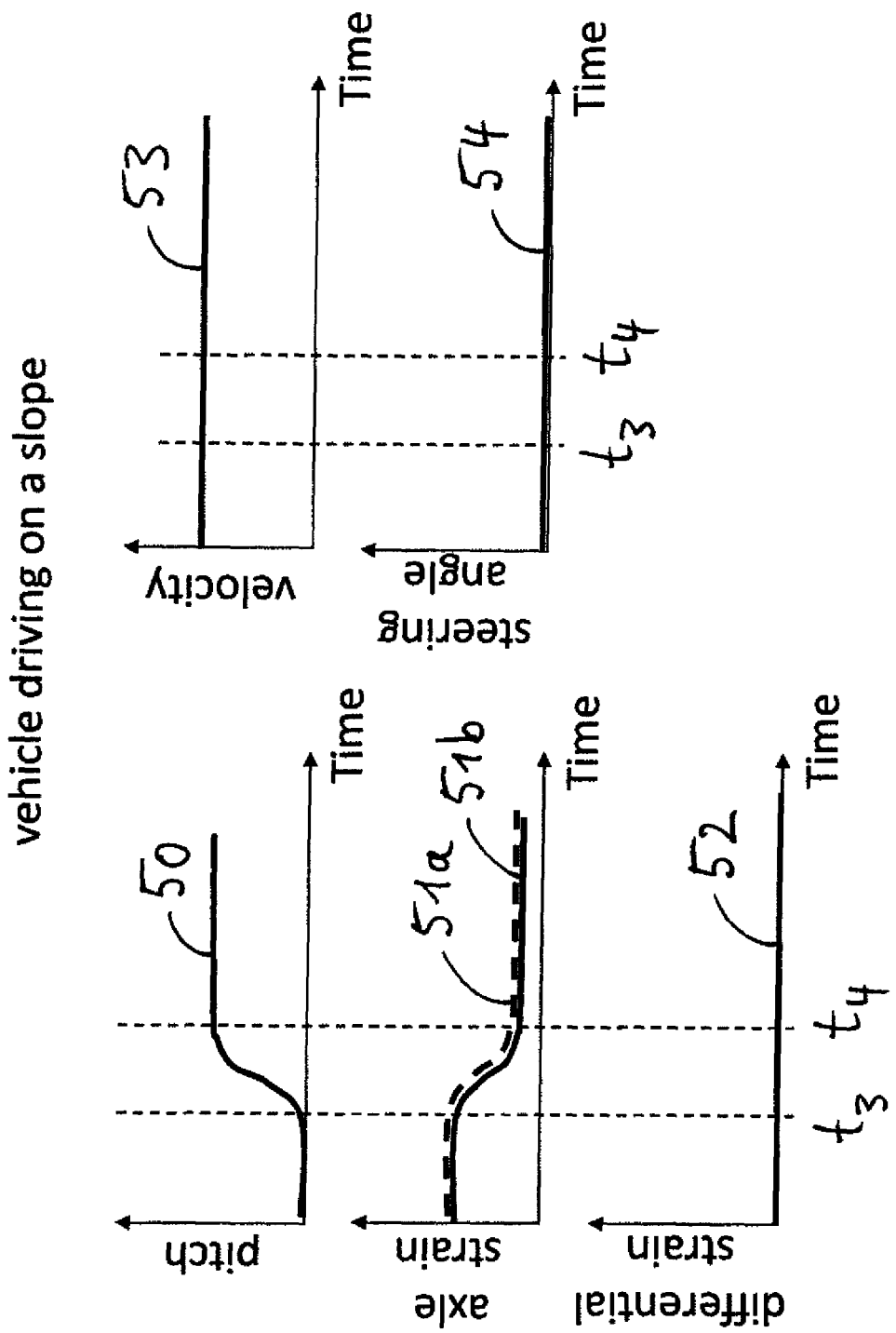
FIG. 5 shows vehicle attitude data, axle strain data, vehicle velocity data and vehicle steering data acquired during the supervised learning phase, wherein the data is acquired while the vehicle is driving on a slope.
Figure 6:
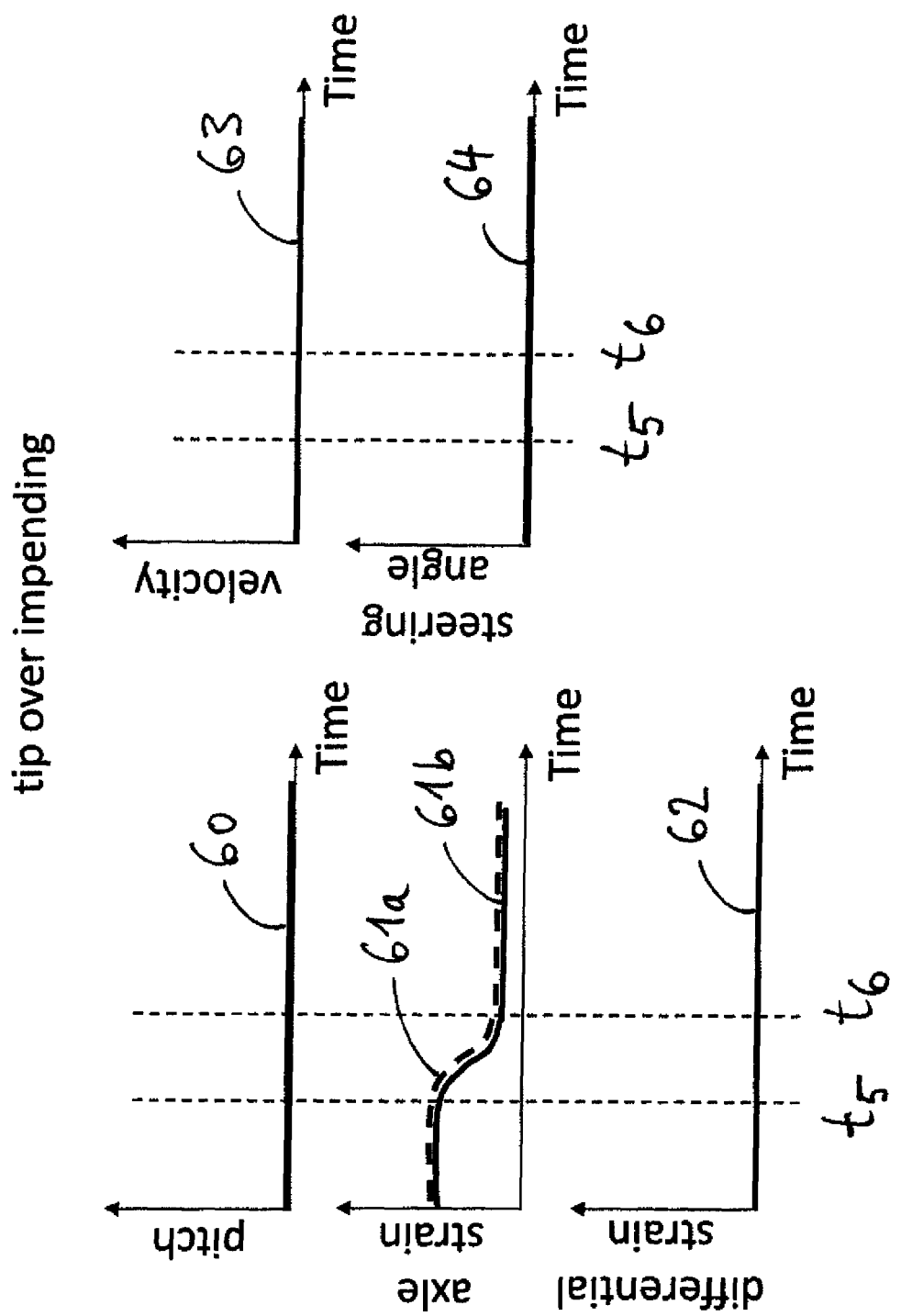
FIG. 6 shows vehicle attitude data, axle strain data, vehicle velocity data and vehicle steering data acquired during the supervised learning phase, wherein the data is acquired while a load is placed on the extendable boom of the vehicle and the boom is extended away from the vehicle in the forward direction.

FIGS. 4-6 illustrate examples of first measurement data acquired by the sensor system 7 during the supervised learning phase. The first measurement data depicted in FIGS. 4 and 5 is recorded while the vehicle 1 is corning and while the vehicle 1 is driving on a slope, respectively. In the situations associated with the first measurement data shown in FIGS. 4 and 5 the position of center of mass of the vehicle 1 relative to the vehicle 1 remains within a stability zone defined relative to the vehicle 1 so that the wheels 4a-d remain firmly on the ground and the vehicle is not in danger of tipping over. By contrast, the first measurement data depicted in FIG. 6 is recorded while a load is placed on the boom 6 of the vehicle 1 and the boom 6 is gradually extended away from the vehicle 1 in the forward direction. The first measurement data shown in FIG. 6 is therefore indicative of a shift of the position of the center of mass of the vehicle 1 out of the stability zone so that the vehicle 1 is in danger of tipping over.

Specifically, FIGS. 4-6 comprise: time sequences 40, 50, 60 of a pitch angle of the vehicle 1 derived from attitude data measured by the gyrometers of the sensor platforms 8a-d; time sequences 41a, 41b, 51a, 51b, 61a, 61b of a mechanical strain of the rear axle 3 of the vehicle 1 measured by the strain gauges 16a, 16b of the sensor platform 8c; time sequences 42, 52, 62 of the differential strain of the rear axle 3 measured by the strain gauges 16a, 16b of the sensor platform 8c; time sequences 43, 53, 63 of the velocity of the vehicle 1 derived from speed values measured by the speed sensors 10a-d; and time sequences 44, 54, 64 of a steering angle of the vehicle 1 measured by the steering sensor 9.

In FIG. 4 it can be observed that the vehicle 1 is driven at a constant non-zero velocity 43. As the steering angle 44 is increased at a point in time $t_1$ until it reaches a maximum value at a subsequent point in time $t_2$, the steering forces acting on the rear axle 3 cause the axle 3 to be deformed within the x-y-plane. Consequently, the strain gauges 16a, 16b of the sensor platform 8c disposed on the rear axle 3 are stretched and compressed as indicated at 41a, 41b, respectively, similar to the situation shown in FIG. 3b, and the differential strain 42 is increased. The pitch angle of the vehicle 1 remains at zero degrees throughout in FIG. 4.

In FIG. 5 it can be observed that the vehicle 1 is again driven at a constant non-zero velocity 53. As the vehicle 1 is driven up a slope between a point in time $t_3$ and a subsequent point in time $t_4$, the pitch angle 50 measured by the gyrometers of the sensor platforms 8a-d is increased. At the same time, the vertical load acting on the rear axle 3 along the z-direction 20 increases while the vehicle 1 is driving uphill. The increasing vertical load acting on the rear axle 3 results in a uniform compression of both strain gauges 16a, 16b of the sensor platform 8c, as indicated at 51a, 51b in FIG. 5. Specifically, as the vehicle 1 is moving uphill more weight is transferred to the rear axle 3, thereby causing the upper surface of the rear axle 3 to bend and compressing the strain gauges 16a, 16b attached to the upper surface of the rear axle 3. The deformation of the rear axle 3 in FIG. 5 is similar to the deformation of the rear axle 3 depicted in FIG. 3a, for example.

In FIG. 6 the vehicle 1 is at rest, as is indicated by the zero velocity 63. As the boom 6 is extended further and further away from the vehicle 1 in the forward direction, the vertical load acting on the rear axle 3 along the z-direction 20 starts decreasing at a point in time $t_5$ until it reaches a minimum value at a subsequent point in time $t_6$. At $t_6$ the vehicle 1 may be at the verge of tipping forward and the operator stops the extension of the boom 6 in the forward direction, thereby just preventing the vehicle 1 from tipping forward as is indicated by the constant pitch angle 60.

During the supervised learning phase depicted in FIGS. 4-6 the sensor platforms 8a-d and the sensors 9, 10a-d, 11 may constantly acquire first measurement data and send the first measurement data to the master control unit 15 of the sensor platform 8c. The master control unit 15 may process the acquired first measurement data and store corresponding data sets $p_1, \ldots, p_k$ in a database in the data storage device of the master control unit 15.

Furthermore, the master control unit 15 assigns one of a first label and a second label to each of the data sets $p_1, \ldots, p_k$ acquired during the supervised learning phase. A data set of the plurality of data sets $p_1, \ldots, p_k$ is assigned the first label if the corresponding data set is associated with an impending tip over of the vehicle 1. By contrast, a data set of the plurality of data sets $p_1, \ldots, p_k$ is assigned the second label if the corresponding data set is associated with the vehicle 1 being stable. The labels assigned to the data sets $p_1, \ldots, p_k$ are saved in the database along with the data sets $p_1, \ldots, p_k$.

A given data set of the plurality of data sets $p_1, \ldots, p_k$ acquired during the supervised learning phase may be identified as being indicative of an impending tip over and marked with the first label based on an input command from the operator of the vehicle 1. For example, the operator may manually enter a corresponding input command through the central vehicle control unit 12 once one or more of the wheels 4a-d of the vehicle 1 start lifting from the ground. Also, the master control unit 15 may display at least some of the values measured by the sensor platforms 8a-d and/or the sensors 9, 10a-d, 11 or values derived from the measured values on an output device of the central vehicle control unit 12, and the operator may manually enter an input command to label the corresponding data set with the first label if one or more of the measured values or of the values derived from the measured values falls outside a predetermined range. For example, when one or more of the measured values or the of the values derived from the measured values falls outside the predetermined range during the supervised learning phase, the master control unit 15 may alert the operator by triggering an alarm signal, such as an optical alarm signal and/or an acoustic alarm signal.

It is likewise conceivable that the master control unit 15 of the sensor system 7 automatically marks a given data set of the plurality of data sets $p_1, \ldots, p_k$ acquired during the supervised learning phase as dangerous by labeling it with the first label if one or more of the measured values comprised in that data set or if one or more of the values derived from the measured values comprised in that data set (such as the differential strain or a rate of change of one or more of the measured values) falls outside a predetermined range or outside a predetermined subset of a measurement data space, wherein the measurement data space is a multidimensional (vector) space that includes the data sets $p_1, \ldots, p_k$. A dimension n ("n" being a positive integer) of the measurement data space corresponds to the number of measured values and/or derived values which are comprised in each of the data sets $p_1, \ldots, p_k$.

The data sets acquired during the supervised learning phase which are associated with the vehicle 1 being stable may be marked with the second label manually or automatically in an analogous manner. Typically, the master control unit 15 automatically marks a given data set of the plurality of data sets $p_1, \ldots, p_k$ with the second label by default unless it is marked with the first label as described above.

Figure 7A:
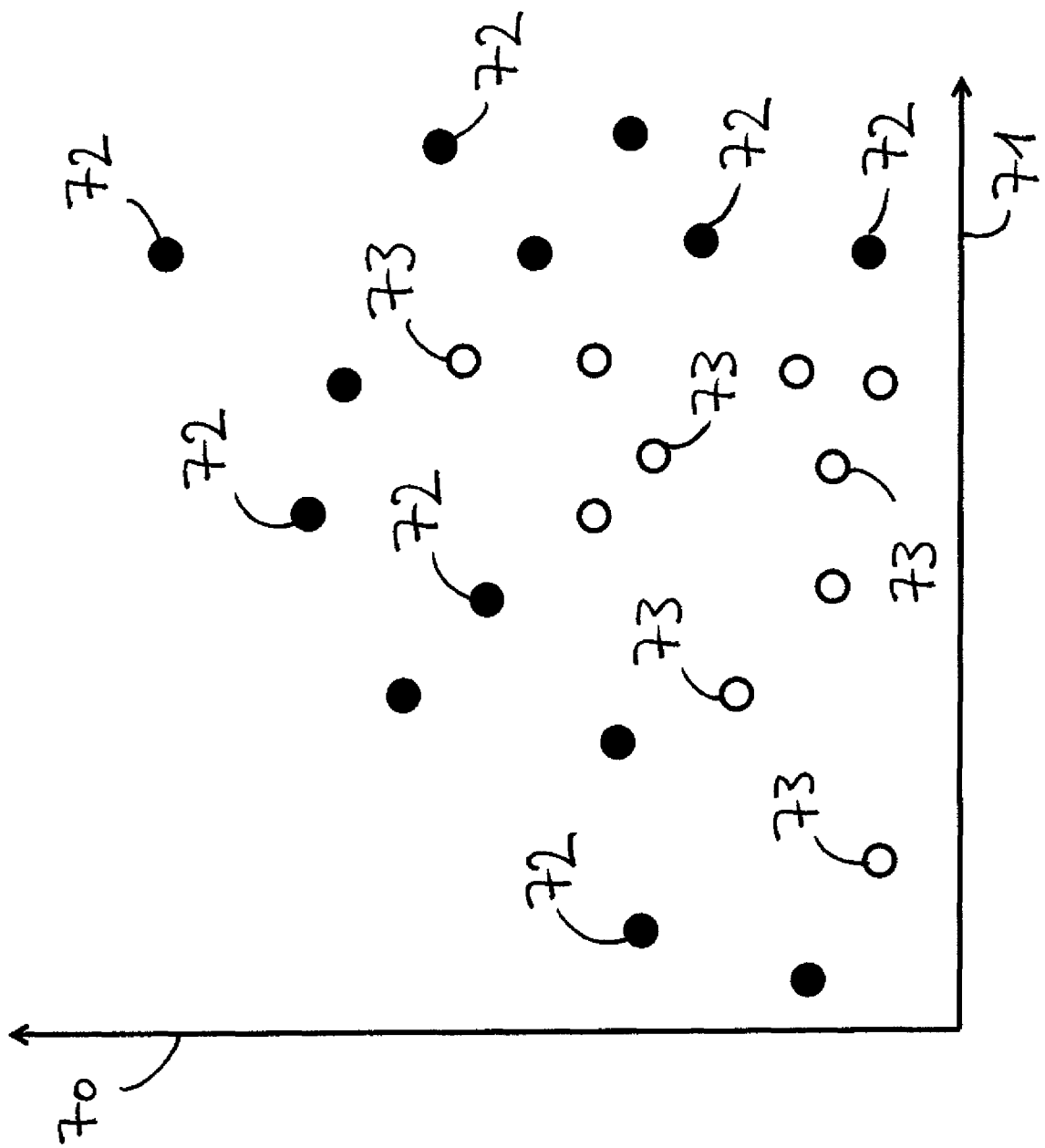
FIG. 7a shows a measurement data space including data sets acquired during the supervised learning phase, wherein data sets which are indicative of an impending tip over are marked with a first label and wherein data sets which are not indicative of an impending tip over are marked with a second label.
Figure 7B:
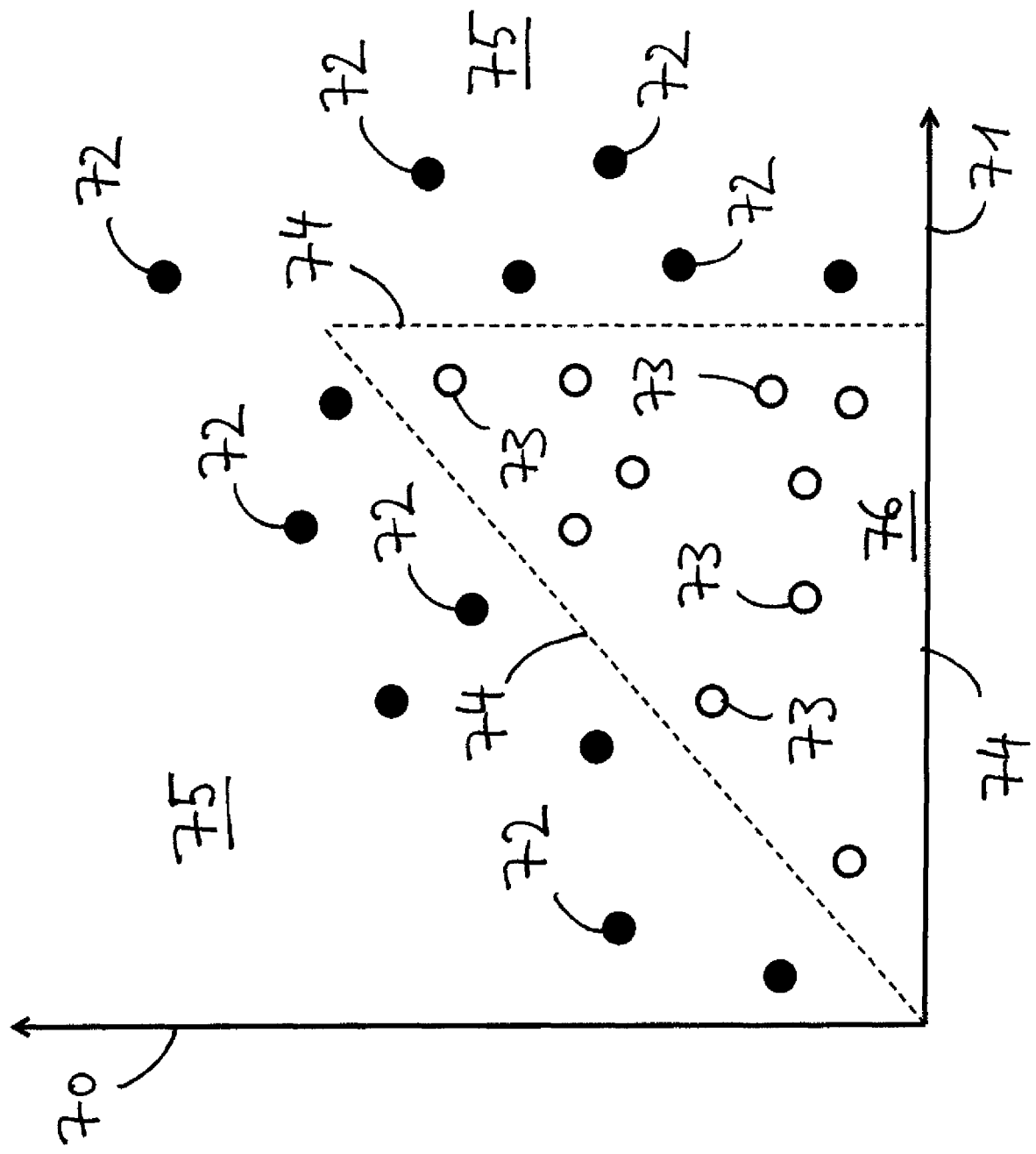
FIG. 7b shows a first and a second continuous subset of the measurement data space, wherein the first continuous subset includes the data sets labeled with the first label and wherein the second continuous subset includes the data sets labeled with the second label.

In FIGS. 7a and 7b each data set acquired during the supervised learning phase and saved in the database of the master control unit 15 is represented by a single round dot and plotted in a two-dimensional subspace of the n-dimensional measurement data space for simplicity. The y-axis 70 may represent the differential strain measured by the strain sensor 16 of the sensor platform 8c and the x-axis 71 may represent the roll angle of the vehicle 1 measured by the gyrometers of the sensor platforms 8a-d, for example. In FIGS. 7a, 7b the data sets 72 associated with dangerous situations and marked with the first label are represented by filled (i.e. black) dots whereas the data sets 73 associated with safe situations and marked with the second label are represented by unfilled (i.e. white) dots. For simplicity, only some of the dots in FIGS. 7a-b (and in FIGS. 8a-c) are explicitly designated with reference numerals. It should be stressed that the position of the dots representing the measured data sets in the two-dimensional plots of FIGS. 7a-b, 8a-c is purely schematic and not necessarily intended to bear any physical significance.

Typically, the region or regions of the n-dimensional measurement data space which represent data sets associated with dangerous situations form one or more first continuous subsets of the n-dimensional measurement data space. Analogously, the region or regions of the n-dimensional measurement data space which represent data sets associated with safe situations form one or more second continuous subsets of the n-dimensional measurement data space, wherein the first and the second continuous subsets are disjoint or complementary subsets of the n-dimensional measurement data space. To identify these disjoint or complementary continuous subsets the master control unit 15 runs a classification algorithm which determines the generally n-dimensional geometry of the first and the second continuous subspace.

FIG. 7b shows the boundary 74 between the first continuous subset 75 and the second continuous subset 76 of the measurement data space. Based on the positions of the data sets 72 associated with dangerous situations and labeled with the first label and based on the positions of the data sets 73 associated with safe situations and labeled with the second label, the master control unit 15 determines the geometry or shape of the first subset 75 and of the second subset 76. Specifically, the control unit 15 determines the geometry of the first subset 75 such that the first subset 75 comprises the data sets 72 and such that the first subset 75 does not comprise the data sets 73. Analogously, the master control unit 15 determines the geometry or shape of the second subset 76 such that the second subset 76 comprises the data sets 73 and such that and the second subset 76 does not comprise the data sets 72.

It is conceivable that the master control unit 15 determines the geometry of the first subset 75 and of the second subset 76 based on the data sets 72 associated with dangerous situations only. For example, the master control unit 15 may determine the geometry of the first subset 75 such that the boundary 74 encloses the data sets 72 and minimizes the n-dimensional volume of the first subset 75.

In general, the continuous subsets 75, 76 are n-dimensional subsets of the n-dimensional measurement data space and the boundary 74 separating the first continuous subset 75 from the second continuous subset 76 comprises one or more continuous (n−1)-dimensional subsets embedded in the n-dimensional measurement data space. In FIG. 7b, the boundary 74 is represented by a polygon. In principal, any known classification algorithm may be used for determining the continuous subsets 75, 76 and/or the boundary 74 separating the subsets 75, 76 based on the positions of the data sets in the database and based on the labels assigned to the data sets saved in the database.

Figure 8A:
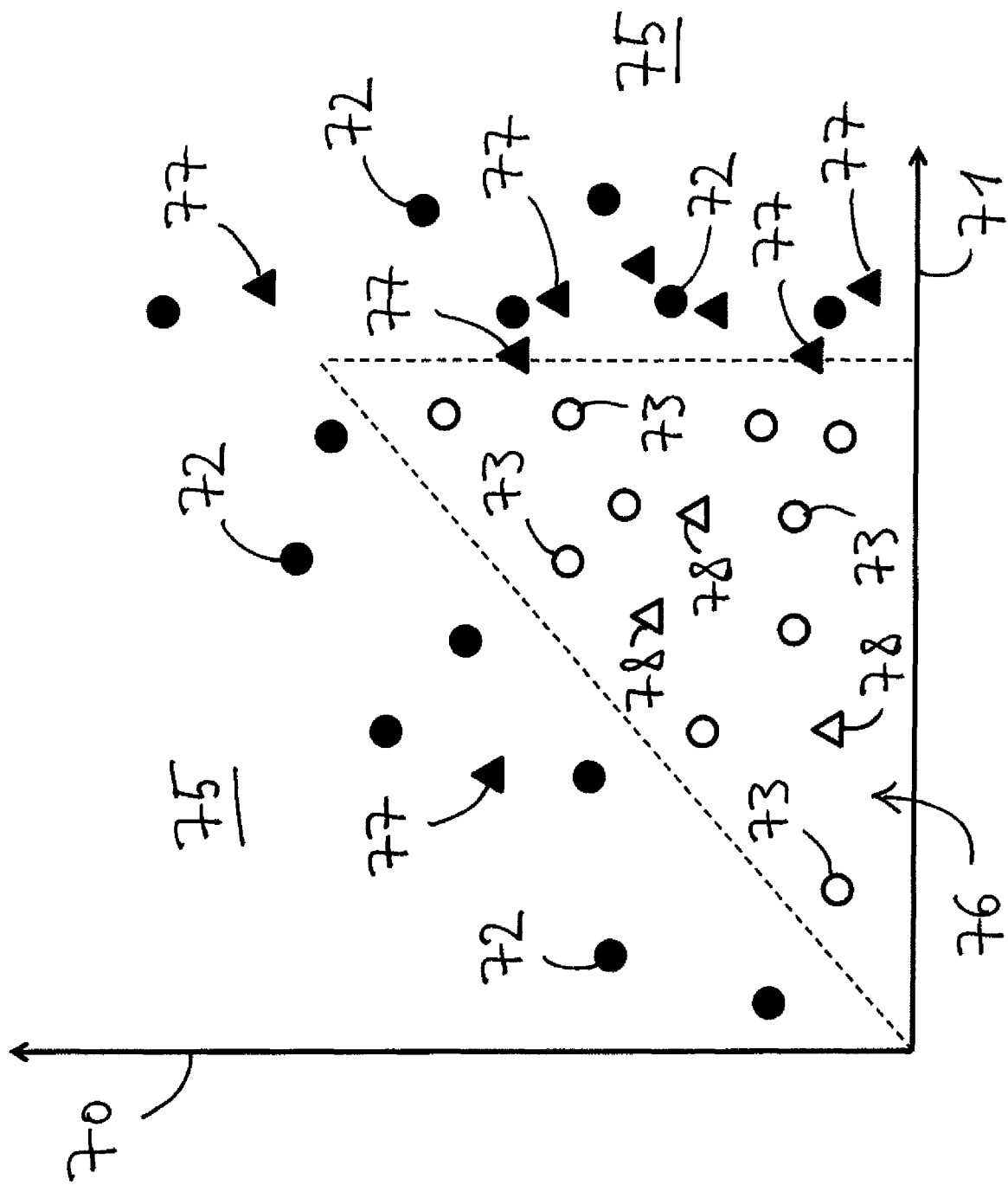
FIG. 8a shows the diagram of FIG. 7b, additionally including data sets acquired during normal operation of the vehicle, wherein the data sets falling within the first continuous subset are classified as being indicative of an impending tip over and wherein the data sets falling within the second continuous subset are classified as not being indicative of an impending tip over.
Figure 8B:
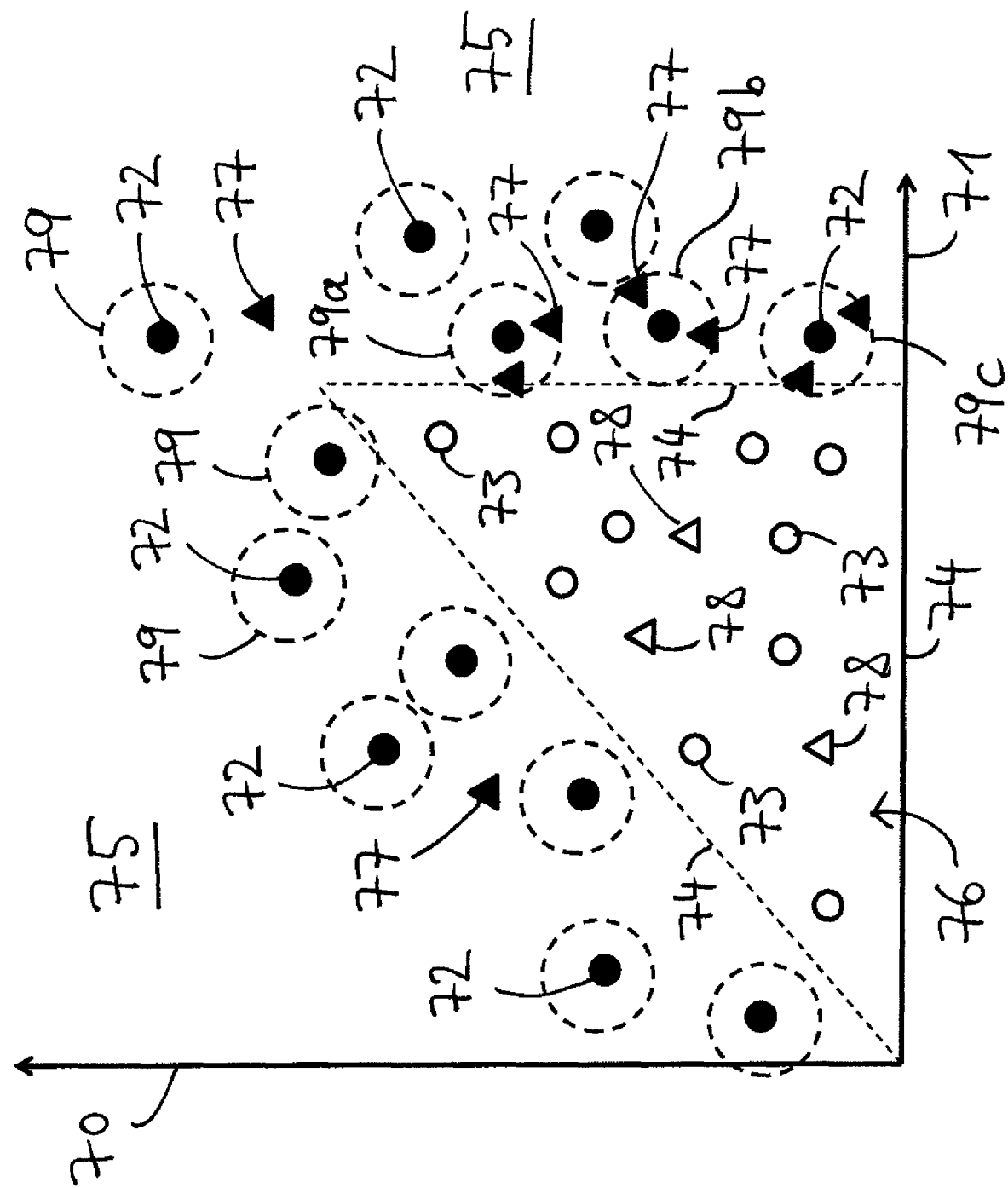
FIG. 8b shows the diagram of FIG. 8a, additionally depicting predefined neighbourhoods of data sets labeled with the first label.
Figure 8C:
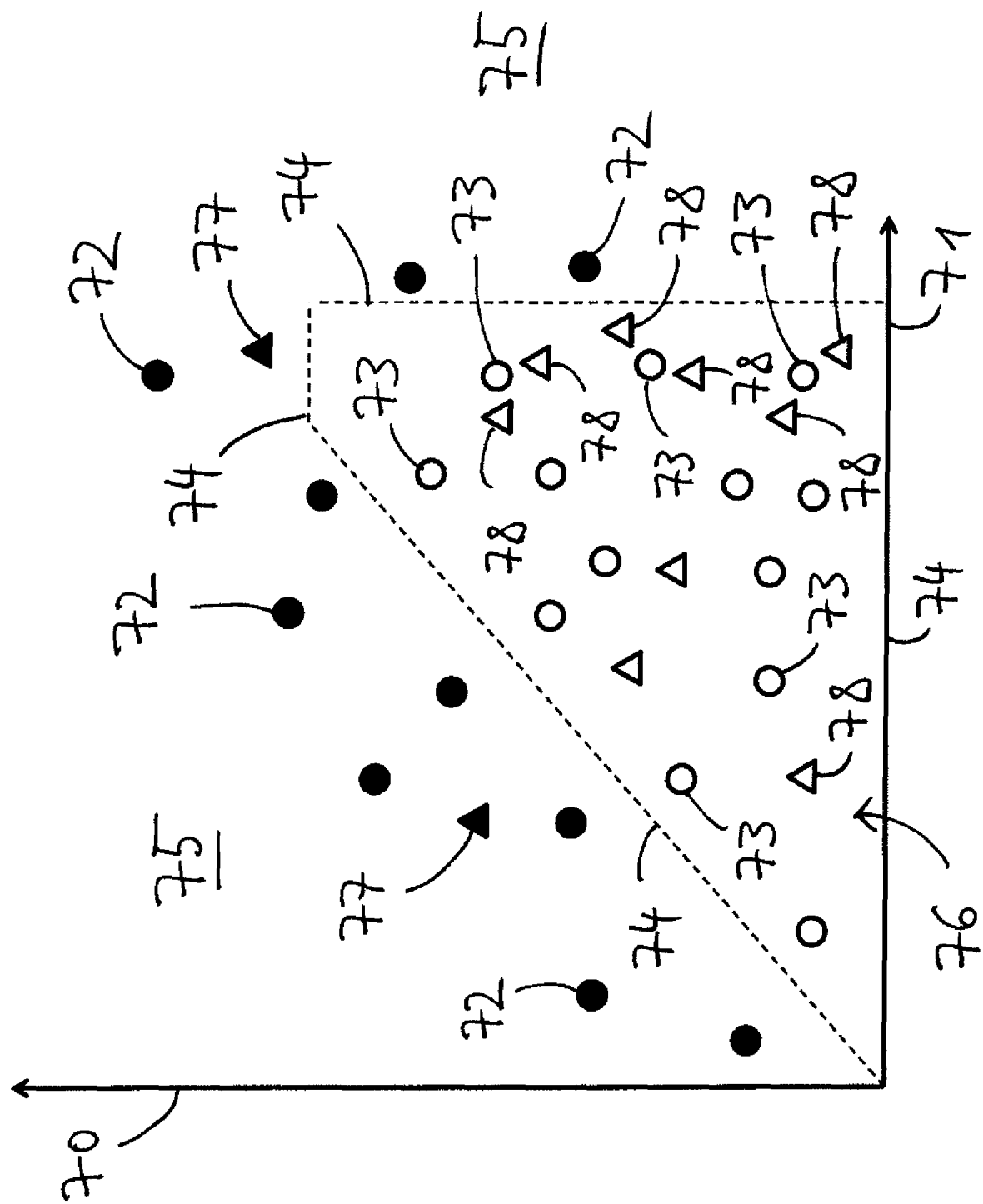
FIG. 8c shows the diagram of FIG. 8b after the re-labeling of some of the data sets formerly labeled with the first label and after re-shaping the geometry of the boundary separating the first and the second continuous subset of the measurement data space.

Once the master control unit 15 has determined the continuous subsets 75, 76 the sensor system 7 is ready to be used for tip over detection during normal operation of the vehicle 1, as illustrated in FIGS. 8a-c. During normal operation of the vehicle 1 the sensor platforms 8a-d and the sensors 9, 10a-d, 11 continuously acquire second measurement data and send the acquired second measurement data to the master control unit 15. Like the first measurement data acquired during the supervised learning phase, the second measurement data acquired during normal operation of the vehicle 1 comprises a plurality of second data sets $q_1, \ldots, q_m$ ("m" being a positive integer index), each of the second data sets $q_1, \ldots, q_m$ comprising the same measured quantities and/or quantities derived from the measured quantities as the first data sets $p_1, \ldots, p_k$ acquired during the supervised learning phase.

In FIGS. 8a-c these second data sets are represented by triangles 77, 78. As soon as a second data set is acquired during normal operation of the vehicle 1, the master control unit 15 of the sensor system 7 determines if the newly acquired second data set is indicative of an impending tip over or not based on whether the newly acquired second data set falls within the first continuous subset 75 or within the second continuous subset 76 of the measurement data space.

If the newly acquired second data set falls within the first continuous subset 75 the master control unit 15 classifies the newly acquired second data set as being indicative of an impending tip over of the vehicle 1. In this case, the master control unit 15 triggers a warning signal to alert the operator of the vehicle 1. Additionally or alternatively, the master control unit 15 may override or overwrite an input command entered by the operator. For example, if the master control unit 15 detects that the vehicle 1 is in danger of tipping over due to an over-extension of the boom 6, the master control unit 15 may send an electronic signal to the central vehicle control unit 12 to command the central vehicle control unit 12 to immediately inhibit any further extension of the boom 6 or to immediately cause the boom 6 to be pulled in to prevent the vehicle 1 from tipping.

After the master control unit 15 has classified the newly acquired second data set as being indicative of an impending tip over, the master control unit 15 labels this newly acquired second data set with the first label and saves this newly acquired second data set including the label in the database. In FIGS. 8a-b the second data sets which are acquired during normal operation of the vehicle 1 and which, upon their acquisition, are classified as being indicative of an impending tip over of the vehicle 1 are represented by the filled (i. e. black) triangles 77.

By contrast, if a second data set acquired during normal operation of the vehicle 1 falls within the second continuous subset 76, the master control unit 15 classifies this second data set as not being indicative of an impending tip over of the vehicle 1. The master control unit 15 then labels this newly acquired second data set with the second label and saves the newly acquired second data set including the label in the database. In FIGS. 8a-b the second data sets which are acquired during normal operation of the vehicle 1 and which, upon their acquisition, are classified as not being indicative of an impending tip over of the vehicle 1 are represented by the unfilled (i. e. white) triangles 78.

The master control unit 15 of the sensor system 7 may use the second data sets 77, 78 acquired during normal operation of the vehicle 1, i. e. after completion of the supervised learning phase, to continuously update the classifier. For this reason, the phase of the learning algorithm following the completion of the supervised learning phase and executed during normal operation of the vehicle 1 may be termed reinforcement learning phase. Specifically, the master control unit 15 may use the second data sets 77, 78 to update the geometry of the continuous subsets 75, 76, in particular the geometry or shape of the boundary 74 separating the continuous subsets 75, 76, each time one or more newly acquired second data sets 77, 78 have been added to the database. Updating the geometry of the continuous subsets 75, 76 may include determining the geometry of the continuous subsets 75, 76 based on the updated database, that is based on the (n-dimensional) positions of the data sets saved in the updated database and based on the labels assigned to the data sets saved in the updated database.

Updating the continuous subsets 75, 76 may further include determining if a second data set 77 which, upon its acquisition, falls within the first subset 75, falls within a predetermined neighbourhood 79 of any of the data sets 72, 77 which are saved in the database and which are marked with the first label. If this is not the case, the master control unit 15 may simply mark the corresponding data set 77 with the first label and save it in the database as described above.

However, if the master control unit 15 determines that a newly acquired second data set 77 falls within a predetermined neighbourhood 79 of any of the data sets 72, 77 which are saved in the database and which are marked with the first label, the master control unit 15 may additionally determine if the total number of data sets saved in the database and falling within this neighbourhood is above a predefined threshold frequency $\omega$. In the present example, this threshold frequency $\omega$ may be given by a fixed value of three data sets per neighbourhood, for example. As can be seen in FIG. 8b, the neighbourhoods 79a, 79b and 79c each include at least three data sets 72, 77. In a subsequent step, the master control unit 15 may then re-label the data sets 72, 77 falling within the neighbourhoods 79a-c by labeling them with the second label and by updating the database accordingly. Based on this updated database, the master control unit 15 may then update the geometry of the continuous subsets 75, 76, in particular the geometry of the boundary 74 separating the continuous subsets 75, 76. Alternatively, the above mentioned threshold frequency $\omega$ could be determined according to the formula $\omega=k\cdot N/T$ as described further above.

The result of the above described process of updating the continuous subsets 75, 76 can be seen in FIG. 8c. In FIG. 8c the data sets 72, 77 included in the neighbourhoods 79a-c in FIG. 8b have been labeled with the second label (their filling has been changed from black to white) and renamed 73, 78. Additionally, the geometry of the boundary 74 separating the first continuous subset 75 from the second continuous subset 76 has been changed. The updated second continuous subset 76 now additionally includes those data sets 73, 78 which were formerly included in the neighbourhoods 79a-c (see FIG. 8b). The updated continuous subsets 75, 76 may be used for the classification of future second data sets measured or acquired during normal operation of the vehicle 1.

The invention claimed is:

1. A method of detecting an impending tip over of a vehicle, in particular for identifying false positives during tip over detection, the method comprising the steps:
acquiring first measurement data using at least one first sensor, the first measurement data comprising vehicle axle strain data, and at least one of attitude data and acceleration data;
acquiring second measurement data using at least one second sensor, the second measurement data comprising vehicle axle strain data, and at least one of attitude data and acceleration data;
using an electronic control unit to determine, based on the first measurement data and based on the second measurement data, if the second measurement data is indicative of an impending tip over of the vehicle; and
only when the electronic control unit determines that the second measurement data is indicative of an impending tip over of the vehicle, using the electronic control unit to trigger an alarm signal, to override a control command or to overwrite a control command.

2. The method of claim 1, wherein the step of acquiring the first measurement data using the at least one first sensor comprises using the at least one first sensor to acquire a plurality of first data sets, wherein for each of the first data sets acquiring the first data set comprises acquiring, at the same point in time, vehicle axle strain data, and at least one of attitude data and acceleration data;

wherein the electronic control unit saves those first data sets of the plurality of first data sets which are indicative of an impending tip over of the vehicle in a database and marks them with a first label; and wherein the electronic control unit determines if the second measurement data is indicative of an impending tip over based on the second measurement data and at least on the first data sets marked with the first label.

3. The method of claim 2, the electronic control unit identifies a first data set of the plurality of first data sets as being indicative of an impending tip over and marks it with the first label based on an input command provided by an operator.

4. The method of claim 2, wherein the electronic control unit automatically identifies a first data set of the plurality of first data sets as being indicative of an impending tip over and wherein the electronic control unit automatically marks said first data set with the first label when at least one the values, measured by the at least one first sensor and comprised in said first data set falls outside a predetermined range.

5. The method of claim 2, wherein the electronic control unit saves the first data sets which are not indicative of an impending tip over in the database and marks them with a second label; and wherein the electronic control unit determines if the second measurement data is indicative of an impending tip over based on the second measurement data, on the first data sets, and on the labels assigned to the first data sets.

6. The method of claim 2, wherein the step of acquiring the second measurement data using the at least one second sensor comprises using the at least one second sensor to acquire a second data set, wherein acquiring the second data set comprises acquiring, at the same point in time, vehicle axle strain data, and at least one of attitude data and acceleration data; and wherein the step of the electronic control unit determining if the second measurement data is indicative of an impending tip over comprises:

using the electronic control unit to determine, based on the first data sets marked with the first label, at least one continuous subset of a measurement data space, the measurement data space comprising the first data sets and the second data set, wherein the electronic control unit determines the continuous subset such that the continuous subset does not comprise the data sets labeled with the first label; and using the electronic control unit to identify the second data set as being indicative of an impending tip over if the second data set falls outside the continuous subset, and using the electronic control unit to identify the second data set as not being indicative of an impending tip over when the second data set falls within the continuous subset.

7. The method of claim 6, wherein the step of acquiring the second measurement data using the at least one second sensor comprises using the at least one second sensor to acquire a second data set, wherein acquiring the second data set comprises acquiring, at the same point in time, vehicle axle strain data, and at least one of attitude data and acceleration data; and wherein, when the electronic control unit determines that the second data set is indicative of an impending tip over and when the electronic control unit determines that the second data set does not fall within a neighborhood of any of the data sets labeled with the first label, the electronic control unit updates the database by saving the second data set in the database and by labeling the newly saved second data set with the first label.

8. The method of claim 6, wherein the step of acquiring the second measurement data using the at least one second sensor comprises using the at least one second sensor to acquire a second data set, wherein acquiring the second data set comprises acquiring, at the same point in time, vehicle axle strain data, and at least one of attitude data and acceleration data; and wherein, when the electronic control unit determines that the second data set is indicative of an impending tip over, when the electronic control unit determines that the second data set falls within a neighborhood of a data set X saved in the database and labeled with the first label, and when the electronic control unit determines that a frequency of the event that a second data set falls within the neighborhood of the data set X is above a threshold frequency, the electronic control unit updates the database by re-labeling the data set X with the second label.

9. The method of claim 6, further including the step of:
using the electronic control unit to update the continuous subset such that the updated continuous subset does not comprise the data sets labeled with the first label.

10. A sensor system for detecting an impending tip over of a vehicle, and in particular for identifying false positives during tip over detection, the sensor system comprising:

at least one strain sensor for acquiring vehicle axle strain data;

at least one further sensor, the further sensor comprising at least one of a gyrometer for acquiring attitude data and an accelerometer for acquiring acceleration data; and a control unit;

wherein the sensors are configured to acquire first measurement data and second measurement data, the first measurement data and the second measurement data each including vehicle axle strain data, and at least one of attitude data and acceleration data; and wherein the control unit is configured to control the strain sensor and the at least one further sensor.

11. The sensor system of claim 10, further comprising at least one of:

one or more steering sensors for acquiring vehicle steering data;

one or more speed sensors for acquiring vehicle speed data;

one or more tire pressure sensors for acquiring tire pressure data; and an input device for controlling a working implement of the vehicle;

wherein the first and the second measurement data include at least one of vehicle steering data, vehicle speed data, tire pressure data and working implement control data.

12. The sensor system of claim 10, wherein the strain sensor includes at least two strain gauges disposed on a common mechanical support, wherein the strain gauges are spaced apart from each other so that the strain gauges are configured to simultaneously acquire vehicle axle strain data at different positions on a vehicle axle.

13. The sensor system of claim 12, wherein the strain sensor, the at least one further sensor and the control unit are disposed on the common mechanical support, thereby forming a sensor platform.

14. The sensor system of claim 13, comprising two or more sensor platforms of the aforementioned type, the sensor platforms being configured to exchange data with each other, thereby forming a distributed sensor network.

15. The sensor system of claim 14, further comprising a central vehicle control unit and a CAN bus, wherein one of the sensor platform control units is configured to function as a master control unit of the sensor network, wherein the master control unit is configured to communicate with the central vehicle control unit via the CAN bus.

* * * * *